US012763337B2

(12) United States Patent
Otake et al.

(10) Patent No.: US 12,763,337 B2
(45) Date of Patent: Oct. 13, 2026

(54) GAS DIFFUSION ELECTRODE BASE MATERIAL PRODUCT AND POLYMER ELECTROLYTE FUEL CELL

(71) Applicant: TORAY INDUSTRIES, INC., Tokyo (JP)

(72) Inventors: Hiroaki Otake, Otsu (JP); Masamichi Utsunomiya, Otsu (JP); Fumitaka Watanabe, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 644 days.

(21) Appl. No.: 18/037,616

(22) PCT Filed: Nov. 25, 2021

(86) PCT No.: PCT/JP2021/043124
§ 371 (c)(1),
(2) Date: May 18, 2023

(87) PCT Pub. No.: WO2022/114040
PCT Pub. Date: Jun. 2, 2022

(65) Prior Publication Data

US 2024/0030461 A1 Jan. 25, 2024

(30) Foreign Application Priority Data

Nov. 26, 2020 (JP) ................................ 2020-195646

(51) Int. Cl.

| | |
|---|---|
| ***H01M 4/88*** | (2006.01) |
| ***H01M 4/86*** | (2006.01) |
| ***H01M 4/96*** | (2006.01) |
| ***H01M 8/1004*** | (2016.01) |
| ***H01M 8/1018*** | (2016.01) |
| *H01M 8/10* | (2016.01) |

(52) U.S. Cl.
CPC ....... *H01M 4/8807* (2013.01); *H01M 4/8605* (2013.01); *H01M 4/8673* (2013.01); *H01M 4/96* (2013.01); *H01M 8/1004* (2013.01); *H01M 8/1018* (2013.01); *H01M 2008/1095* (2013.01)

(58) Field of Classification Search
CPC .... H01M 4/88; H01M 4/8807; H01M 4/8607; H01M 4/7673
See application file for complete search history.

(56) References Cited

U.S. PATENT DOCUMENTS

| | | | | |
|---|---|---|---|---|
| 9,523,163 | B2 | 12/2016 | Kyotani et al. | |
| 2007/0141405 | A1* | 6/2007 | Lai | H01M 8/04126 429/534 |
| 2007/0238010 | A1 | 10/2007 | Zhang et al. | |
| 2010/0028756 | A1* | 2/2010 | Shiramizu | H01M 4/8828 429/494 |
| 2010/0291473 | A1* | 11/2010 | Ji | H01M 4/8814 429/523 |
| 2015/0167200 | A1* | 6/2015 | Kyotani | D01F 9/16 423/447.4 |
| 2015/0207151 | A1 | 7/2015 | Utsunomiya et al. | |
| 2016/0133946 | A1 | 5/2016 | Tsubosaka et al. | |
| 2016/0293987 | A1* | 10/2016 | Okuyama | H01M 4/8828 |

FOREIGN PATENT DOCUMENTS

| | | | |
|---|---|---|---|
| JP | 2001-283874 | A | 10/2001 |
| JP | 2001-307747 | A | 11/2001 |
| JP | 2005-19298 | A | 1/2005 |
| JP | 2005-32667 | A | 2/2005 |
| JP | 2006-128118 | A | 5/2006 |
| JP | 2009-532848 | A | 9/2009 |
| JP | 2013-80590 | A | 5/2013 |
| JP | 2014-135126 | A | 7/2014 |
| JP | 2016-91874 | A | 5/2016 |
| JP | 2017-206568 | A | 11/2017 |
| JP | 2018-152270 | A | 9/2018 |
| WO | WO 02/15303 | A1 | 2/2002 |
| WO | WO 2014/030553 | A1 | 2/2014 |
| WO | WO 2016/047775 | A1 | 3/2016 |

OTHER PUBLICATIONS

Extended European Search Report for European Application No. 21898012.6, dated Jun. 16, 2025.
Japanese Office Action for Japanese Application No. 2021-571310, dated Aug. 12, 2025, with English translation.
International Search Report, issued in PCT/JP2021/043124, PCT/ISA/210, dated Jan. 25, 2022.
Written Opinion of the International Searching Authority, issued in PCT/JP2021/043124, PCT/ISA/237, dated Jan. 25, 2022.

* cited by examiner

*Primary Examiner* — Kenneth J Douyette
(74) *Attorney, Agent, or Firm* — Birch, Stewart, Kolasch & Birch, LLP

(57) ABSTRACT

An object of the present invention is to shorten the aging time for a fuel cell. To achieve the object, a gas diffusion electrode medium product according to the present invention includes sulfuric acid in an amount of 1.1 μg/$cm^2$ or less. In addition, a polymer electrolyte fuel cell according to the present invention has the gas diffusion electrode medium product according to the present invention incorporated therein.

9 Claims, No Drawings

GAS DIFFUSION ELECTRODE BASE MATERIAL PRODUCT AND POLYMER ELECTROLYTE FUEL CELL

TECHNICAL FIELD

The present invention relates to a gas diffusion electrode medium product that is suitably used for an electrode of a polymer electrolyte fuel cell.

BACKGROUND ART

An electrode of a polymer electrolyte fuel cell (hereinafter, simply referred to as a "fuel cell") is commonly composed of: a catalyst layer formed to be in contact with an electrolyte membrane; and a gas diffusion electrode medium superposed on the surface of the catalyst layer. A fuel cell is structurally sandwiched between bipolar plates.

The above-mentioned different members are assembled to form a cell, which then undergoes a step called aging intended to activate the catalyst and verify the absence of a problem, and the fuel cell is thus made practically usable. Here, aging involves generating power for a given period of time under a combination of specific power generation conditions, and thus, to increase the production efficiency of a fuel cell, shortening the time for aging is an issue to be solved. For example, Patent Literature 1 discloses a technology according to which the aging time is shortened by cyclically changing the flow rate of an inert gas to be mixed with an oxidizing gas during the aging. In addition, Patent Literature 2 discloses a technology according to which the aging time is shortened by a contrivance for the electrolyte membrane, that is, by coating an electrolyte membrane layer as a main component with another kind of polymer layer to improve the quality of contact with the electrode. Furthermore, Patent Literature 3 discloses a technology according to which the aging time is shortened by impregnating porous carbon as a catalyst support with an acid to form a proton conduction path efficiently.

CITATION LIST

Patent Literature

Patent Literature 1: JP2019-128976A
Patent Literature 2: JP2009-295572A
Patent Literature 3: JP2011-238485A
Patent Literature 4: WO2015/125750

SUMMARY OF INVENTION

Technical Problem

Another purpose of the aging of a fuel cell is to remove impurities from the surface of the catalyst, and to liquate out an acid contained in each member in the cell, using water generated through power generation. Accordingly, the concentration of the pH of the acid in the water discharged is used as an index to determine the completion time of the aging. That is, when a large amount of a component that works as the origin of an acid is contained in any of the different members in the cell, the time required for the aging becomes longer, resulting in decreasing the production efficiency of the fuel cell. An object of the present invention is to shorten the aging time for a fuel cell.

Solution to Problem

The present inventors have made studies on the derivation of an acid generated during the aging, and consequently discovered that, when carbon paper is immersed in a water repellent resin, as in Patent Literature 4, the liquation of sulfuric acid from a gas diffusion electrode having a microporous layer containing carbon black accounts for a given ratio. The present invention that the present inventors have made on the basis of this discovery to solve the above-mentioned problems encompasses a gas diffusion electrode medium product containing sulfuric acid in an amount of 1.1 $\mu g/cm^2$ or less, and a polymer electrolyte fuel cell having the product incorporated therein.

Advantageous Effects of Invention

Using a gas diffusion electrode medium product according to the present invention makes it possible to shorten the aging time.

DESCRIPTION OF EMBODIMENTS

<Gas Diffusion Electrode Medium Product>

As used herein, a "gas diffusion electrode medium product" means a freshly-produced gas diffusion electrode medium, and excepts a gas diffusion electrode that has already been incorporated in a fuel cell, and started power generation. Typically, a gas diffusion electrode medium product herein is a gas diffusion electrode medium wound into a roll after being produced, or a freshly-produced gas diffusion electrode medium that has been cut out of the roll-shaped gas diffusion electrode medium, and is yet to be incorporated into a fuel cell. As used herein, however, a "gas diffusion electrode medium product" is hereinafter simply referred to as an "electrode medium" in some cases.

In a first suitable aspect of a gas diffusion electrode medium product according to the present invention, it is preferable that the gas diffusion electrode medium product is essentially a conductive porous material. A conductive porous material is typically a porous material having a porous structure having an average pore size of 10 μm or more as measured by a mercury intrusion method. The average pore size is not limited to any particular upper limit, and is usually approximately 100 μm. Examples of such a conductive porous material that is suitably used include a carbon fiber-containing conductive porous material, such as a carbon fiber fabric, carbon fiber paper material, carbon felt, and carbon paper. A conductive porous material composed of a carbon fiber is more suitably used. The conductive porous material preferably has a springy quality (springiness) for giving a good fastening force with respect to absorbing a change in the thickness of the electrolyte membrane during power generation, and with respect to compression caused when electrode members are superposed one on another, and incorporated in cell. From this viewpoint, the conductive porous material is preferably a porous material formed by bonding carbon fibers to one another with a resin carbide. In particular, a porous material formed by bonding carbon fiber paper materials to one another with a resin carbide, i.e., carbon paper or carbon felt, is particularly suitable.

The conductive porous material has a role for diffusing gas as a fuel for a fuel cell, such as oxygen, hydrogen, or water (water vapor) generated. Accordingly, the conductive porous material preferably has a thickness of 220 μm or less. To further enhance the gas diffusivity, the thickness of the conductive porous material is preferably 150 μm or less, still more preferably 100 μm or less. On the other hand, a thinner conductive porous material has better gas diffusivity, but such a material that is too thin will have a decreased handleability, and thus, the lower limit is realistically 70 μm.

Examples of a carbon fiber to be used for a conductive porous material include carbon fibers such as polyacrylonitrile (PAN)-based, pitch-based, and rayon-based carbon fibers. Among these, a PAN-based carbon fiber having excellent mechanical strength and processability is preferably used. The carbon fibers constituting carbon paper preferably have single fibers having an average length (hereinafter referred to as a "carbon fiber length") in the range of from 3 to 20 mm, more preferably in the range of from 5 to 15 mm. The carbon fiber length of 3 mm or more, more preferably 5 mm or more, tends more to allow the carbon fiber sheet to have excellent mechanical strength, electroconductivity, and thermal conductivity. On the other hand, the carbon fiber length of 20 mm or less, more preferably 15 mm or less, tends more to allow the carbon fiber to have an excellent dispersibility in the production of a carbon fiber paper material, and to obtain a homogeneous carbon fiber sheet. A carbon fiber having such a carbon fiber length is obtained, for example, by a method of cutting a continuous carbon fiber to a fiber having a desired length. In addition, a carbon felt base material can be obtained as follows: a carbon fiber precursor is cut into fibers approximately tens of millimeters (commonly 40 mm to 100 mm); and the fibers are processed on a web, and entangled with one another using a needle punch or the like to form an unwoven fabric base material, which then undergoes a carbonization treatment.

Examples of a particularly preferable resin to be used to generate a resin carbide for bonding carbon fibers to one another include thermosetting resins, such as phenol resins, epoxy resins, melamine resins, and furan resins. In addition, to obtain higher electroconductivity and thermal conductivity, the resin carbide may contain carbon particles. Examples of the carbon particles to be contained in the resin carbide include: graphites such as scale-like graphite, vein graphite, amorphous graphite, synthetic graphite, expandable graphite, and flake graphite; carbon nanotubes; carbon nanofibers; and milled fibers of carbon fibers.

A conductive porous material in the present invention is preferably made water-repellent with a water repellent resin so that water produced during the power generation of a fuel cell can be discharged out of the system rapidly. That is, the conductive porous material preferably contains a water repellent resin. In a case in which a porous material formed by bonding carbon fibers to one another with a resin carbide is used as the conductive porous material, the water repellent resin is preferably attached to the carbon fibers. Herein, in a case in which the conductive porous material contains a water repellent resin, the material containing the water repellent resin is also referred to as a "conductive porous material".

Examples of such a water repellent resin to be suitably used include fluoropolymers. Examples of the fluoropolymer include PTFE (polytetrafluoroethylene), FEP (tetrafluoroethylene-hexafluoropropylene copolymer), PFA (perfluoroalkoxy fluoride resin resin), ETFA (ethylene-tetrafluoroethylene copolymer), PVDF (polyvinylidene fluoride), PVF (polyvinyl fluoride), and the like. The amount of the fluoropolymer contained in the conductive porous material is preferably 0.1 wt % or more and 20 wt % or less with respect to 100 wt % of the conductive porous material containing no fluoropolymer. The amount of less than 0.1 wt % causes the water repellency to be insufficient in some cases, and more than 20 wt % causes the electrical resistance to be degraded in some cases. Here, the fluoropolymer contains sulfur in some cases. In the present invention, a fluoropolymer containing sulfur in an amount of 50 ppm or less is preferably used, or a fluoropolymer containing sulfur in an amount of 30 ppm or less is more preferably used, as the water repellent resin. That is, the first suitable aspect of a gas diffusion electrode medium product according to the present invention contains a conductive porous material composed of a carbon fiber, in which a fluoropolymer containing sulfur preferably in an amount of 50 ppm or less is attached to the carbon fiber, or a fluoropolymer containing sulfur more preferably in an amount of 30 ppm or less is attached to the carbon fiber.

A second suitable aspect of a gas diffusion electrode medium product according to the present invention preferably includes: a conductive porous material composed of a carbon fiber; and a microporous layer containing carbon powder and provided on at least one face of said conductive porous material. The conductive porous material is the same conductive porous material as in the description of the above-described first suitable aspect of a gas diffusion electrode medium product according to the present invention. The microporous layer is usually a porous layer having an average pore size of 0.01 μm to 1 μm as measured by a mercury intrusion method.

The microporous layer contains carbon powder. The microporous layer containing carbon powder makes it possible to form a finely porous material, and to afford conductivity. Examples of the carbon powder include carbon black, graphite, expandable graphite, flake graphite, carbon nanotubes, carbon nanofibers, and the like. Among these, carbon black is preferable from the viewpoint of cost and handleability. Here, carbon powder such as carbon black contains sulfur in some cases. In the present invention, the sulfur content of the carbon powder is preferably smaller. Specifically, in the second suitable aspect of a gas diffusion electrode medium product according to the present invention, the sulfur content of the carbon powder is preferably 3000 ppm or less, more preferably 2500 ppm or less. The sulfur content is not limited to any particular lower limit, and is usually approximately 1 ppm.

The second suitable aspect of a gas diffusion electrode medium product according to the present invention preferably includes carbon black heat-treated at 2000° C. or more under an inert atmosphere for 10 minutes or more. Performing such a heat treatment makes it possible that, even in a case in which carbon black containing sulfur in an amount of more than 3000 ppm is used, the sulfur is removed from the carbon black to bring the sulfur content to 3000 ppm or less, and then, the carbon black is incorporated in the microporous layer. The temperature for the heat treatment is not limited to any particular upper limit, and is usually approximately 3000° C.

The microporous layer is preferably water-repellent in the same manner as the above-described conductive porous material. Accordingly, the microporous layer preferably contains a water repellent resin in addition to the carbon powder. As the water repellent resin to be contained in the microporous layer, the same fluoropolymer as for the above-described conductive porous material is suitably used, and the resin and the fluoropolymer are the same in that the sulfur content is preferably smaller. Thus, the repetition of the same description is omitted here.

The second suitable aspect of a gas diffusion electrode medium product according to the present invention contains a conductive porous material composed of a carbon fiber, in which a fluoropolymer containing sulfur preferably in an amount of 50 ppm or less is attached to the carbon fiber, or a fluoropolymer containing sulfur more preferably in an amount of 30 ppm or less is attached to the carbon fiber.

A gas diffusion electrode medium product according to the present invention contains sulfuric acid in an amount of 1.1 μg/cm$^2$ or less. The sulfuric acid content of the gas diffusion electrode medium product is preferably 0.5 μg/cm$^2$ or less, more preferably 0.2 μg/cm$^2$ or less. Allowing the sulfuric acid content to be more than 1.1 μg/cm$^2$ causes the time required for aging to become long. Examples of a method of bringing the sulfuric acid content within the above-mentioned range include a method in which the sulfuric acid content of the above-mentioned members constituting the gas diffusion electrode medium product is adjusted to 1.1 μg/cm$^2$ or less as a whole. The smaller the sulfuric acid content, the more preferable. The lower limit of the sulfuric acid content is not limited to any particular value, and is usually approximately 0.01 μg/cm$^2$.

A polymer electrolyte fuel cell according to the present invention has the gas diffusion electrode medium product according to the present invention incorporated therein. In the polymer electrolyte fuel cell, a solid polymer electrolyte membrane, a catalyst layer, a bipolar plate, and the like, in addition to the above-mentioned gas diffusion electrode medium product, may be incorporated together.

<Method of Producing Gas Diffusion Electrode Medium Product>

In one example, a gas diffusion electrode medium product according to the present invention can be produced as follows: a conductive porous material is made water-repellent; at least one face of the resulting material is coated with a microporous layer coating liquid; and then, the resulting product is sintered. A study made by the present inventors has revealed that, in a case in which the different materials constituting a gas diffusion electrode medium contains a sulfur component (a sulfur oxide or sulfuric acid) in a given amount or a larger amount, the sulfur component is oxidized through the sintering step, so that the sulfuric acid is released. In such a case, performing the sintering at 400° C. or more and 500° C. or less enables the sulfur component to be volatilized and removed. At a sintering temperature of less than 400° C., the sulfur component cannot be removed sufficiently in some cases. In addition, at a sintering temperature of more than 500° C., the fluoropolymer that bonds carbon powder in the microporous layer is decomposed, thus causing the carbon powder to be excessive. In some of the cases, the microporous layer can no longer be maintained in layer form. From such a viewpoint, the sintering temperature is more preferably 410° C. or more and 480° C. or less, still more preferably 420° C. or more and 450° C. or less. In addition, sintering once at a temperature of 250° C. or more and less than 400° C., which is a common sintering temperature, may be followed by further sintering at 400° C. or more and 500° C. or less.

EXAMPLES

Next, a gas diffusion electrode medium product according to the present invention will be specifically described with reference to Examples, and the present invention should not be limited to these Examples. Materials used in Examples, a method of producing a gas diffusion electrode medium product, a method of evaluating the product, and a method of evaluating the product as a fuel cell are described below.

[Sulfuric Acid Content of Electrode Medium]

A gas diffusion electrode medium product, approximately 9 cm$^2$, was cut out and weighed, and then, a component of interest was extracted with 100 mL of ultrapure water. This liquid extract was analyzed by ion chromatography (INTEGRION, manufactured by Thermo Fisher Scientific Inc.), and the amount of sulfuric acid in the electrode medium was quantitated. By dividing this quantitate value by the area of the gas diffusion electrode medium product, the sulfuric acid content (μg/cm$^2$) was determined.

[Sulfur Content]

An object substance was burned at 1000° C. in an electric oven. The gas generated was allowed to be absorbed in an absorbing liquid. Then, 100 μL of the absorbing liquid was analyzed by ion chromatography (ICS1600, manufactured by Dionex), and the sulfur was quantitated. By dividing the quantitative value by the weight of the object substance used for analysis, the sulfur content (ppm) was determined.

[Aging Test]

Platinum-supported carbon (manufactured by Tanaka Kikinzoku Kogyo K.K.; the amount of supported platinum: 50 mass %) in an amount of 1.00 g, 1.00 g of purified water, 8.00 g of a "Nafion" (registered trademark) solution (5.0 mass % "Nafion" (registered trademark), manufactured by Sigma-Aldrich), and 18.00 g of isopropyl alcohol (manufactured by Nacalai Tesque, Inc.) were added in this order to produce a catalyst solution.

Next, a "NAFLON" (registered trademark) PTFE tape "TOMBO" (registered trademark) No. 9001 (manufactured by Nichias Corporation), 5 cm×5 cm, was cut out, spray-coated with a catalyst solution, and dried at ordinary temperature to produce a PTFE sheet with a catalyst layer containing platinum in an amount of 0.3 mg/cm$^2$. Subsequently, a solid polymer electrolyte membrane "Nafion" (registered trademark) NRE-211CS (manufactured by DuPont) cut into an 8 cm×8 cm piece was sandwiched between two PTFE sheets with a catalyst layer, and pressed under a pressure of 5 MPa with a flat plate at a temperature of 130° C. for 5 minutes, so that the catalyst layer was transferred to a solid polymer electrolyte membrane. After the pressing, the PTFE sheet was detached to produce a solid polymer electrolyte membrane with a catalyst layer.

Next, the solid polymer electrolyte membrane with a catalyst layer was sandwiched between two gas diffusion electrode mediums each cut out to a 5 cm×5 cm piece, and pressed under a pressure of 3 MPa with a flat plate at a temperature of 130° C. for 5 minutes to produce a membrane electrode assembly. Then, the membrane electrode assembly obtained was sandwiched with bipolar plates, and the resulting assembly was incorporated into a single cell for evaluating a fuel cell. The bipolar plate used was a serpentine type bipolar plate that had one flow path and the groove width, groove depth, and rib width of which were each 1.0 mm.

Using the fuel cell obtained in this manner, hydrogen under no pressure was supplied to the anode side, and air under no pressure was supplied to the cathode side, whereby power was generated. The hydrogen and the air were both humidified with a humidifying pot set at a temperature of 70° C. The humidity for this was 100%. In addition, the ratios of utilization of the hydrogen and the oxygen in air were set at 70 mol % and 40 mol % respectively, and the temperature of the cell was set at 70° C. In the aging, power generation at a current density of 1.2 A/cm$^2$ was held for 30 minutes, and then, power was generated by alternately repeating power generation at 0.4 A/cm$^2$ and power generation at 1.2 A/cm$^2$ 5 times each for 5 minutes each. Then, at the initial stage of the aging (the stage during which the power generation at a current density of 1.2 A/cm$^2$ was held for 30 minutes) and after completion of the aging, produced water discharged from the cell was collected, and the pH of the produced water was measured.

Example 1

Carbon black A containing sulfur in an amount of 5000 ppm was heat-treated at 2400° C. under an argon stream for 10 minutes to remove the sulfur. The sulfur content of the carbon black A heat-treated (referred to as the carbon black A-H) was 50 ppm.

The carbon black A-H in an amount of 15 parts by weight, 5 parts by weight of a fluoropolymer that was a PTFE dispersion containing sulfur in an amount of 20 ppm, and having a fluoropolymer concentration of 50 mass %, 15 parts by weight of a surfactant (TRITON (registered trademark) X-100), and 65 parts by weight of ion-exchanged water were kneaded using a planetary mixer to prepare a microporous layer coating liquid.

The microporous layer coating liquid was applied to carbon paper (TGP-H-060: manufactured by Toray Industries, Inc.) made water-repellent with the above-mentioned PTFE dispersion, and then, the resulting product was sintered at 350° C. for 20 minutes to produce a gas diffusion electrode medium product. The sulfuric acid content of the gas diffusion electrode medium product obtained was 1.0 μg/cm$^2$, the pH of the produced water at the initial stage of the aging was 3.7, and the pH of the produced water at the completion of the aging was 5.0.

Comparative Example 1

As the carbon black of the microporous layer, the carbon black A was directly used without being heat-treated. Except this operation, a gas diffusion electrode medium product was produced in the same manner as in Example 1. The sulfuric acid content of the gas diffusion electrode medium product obtained was 1.8 μg/cm$^2$, which was large, the pH of the produced water at the initial stage of the aging was 3.5, and the pH of the produced water at the completion of the aging had not reached 5.0.

Example 2

A gas diffusion electrode medium product was obtained by performing the same operation as in Example 1 except that the carbon black B containing sulfur in an amount of 20 ppm was used in place of the carbon black A-H of the microporous layer in Example 1, that the fluoropolymer dispersion containing sulfur in an amount of 20 ppm was used as the fluoropolymer, and that sintering was performed at 420° C. for 20 minutes. The sulfuric acid content of the gas diffusion electrode medium product obtained was 0.7 μg/cm$^2$, the pH of the produced water at the initial stage of the aging was 3.9, and the pH of the produced water at the completion of the aging was 5.2.

Comparative Example 2

A gas diffusion electrode medium product was obtained by performing the same operation as in Example 2 except that sintering was performed at 350° C. for 20 minutes. The sulfuric acid content of the gas diffusion electrode medium product obtained was 1.7 μg/cm$^2$, the pH of the produced water at the initial stage of the aging was 3.5, and the pH of the produced water at the completion of the aging had not reached 5.0.

Example 3

A gas diffusion electrode medium product was obtained by performing the same operation as in Example 1 except that an FEP dispersion containing sulfur in an amount 3 ppm was used as a fluoropolymer to be used for a microporous layer coating liquid in the water repellent treatment of the carbon paper. The sulfuric acid content of the gas diffusion electrode medium product obtained was 0.4 μg/cm$^2$, the pH of the produced water at the initial stage of the aging was 4.1, and the pH of the produced water at the completion of the aging was 5.5.

Example 4

A gas diffusion electrode medium product was obtained by performing the same operation as in Example 3 except that the carbon black B was used as carbon powder to be used for the microporous layer. The sulfuric acid content of the gas diffusion electrode obtained was 0.1 μg/cm$^2$, the pH of the produced water at the initial stage of the aging was 4.7, and the pH of the produced water at the completion of the aging was 6.0.

Comparative Example 3

Carbon paper was obtained by a method described in Example 1 in WO2015/125750. To 95 parts by mass of carbon paper, 5 parts by mass of PTFE was added, and the resulting mixture was dried by heating at 100° C. for 5 minutes to obtain a thickness of 100 μm and an areal weight of 24 g/m $^2$.

A microporous layer was formed using a slit die coater. Here, acetylene black ("DENKA BLACK" (registered trademark), manufactured by Denka Company Limited) that is a kind of carbon black was used for a microporous layer coating liquid, PTFE ("POLYFLON" (registered trademark) D-1E, manufactured by Daikin Industries, Ltd.) was used as a fluoropolymer, "TRITON" (registered trademark) X-100 manufactured by Nacalai Tesque, Inc. was used as a surfactant, and purified water was used as a dispersion medium. The microporous layer coating liquid was adjusted in such a manner that the acetylene black was 7.7 parts by mass, the PTFE was 4 parts by mass, the surfactant was 14 parts by mass, and the purified water was 74.3 parts by mass. Using a die coater, the microporous layer coating liquid was applied, then held horizontally for 60 seconds, then heated (sintered) at 120° C. for 10 minutes and at 380° C. for 10 minutes to obtain a gas diffusion electrode medium product. The sulfuric acid content of the gas diffusion electrode medium product obtained was 2.0 μg/cm$^2$, the pH of the produced water at the initial stage of the aging was 3.4, and the pH of the produced water at the completion of the aging had not reached 5.0.

The invention claimed is:

1. A gas diffusion electrode medium product comprising sulfuric acid in an amount of from 0.01 to 1.1 μg/cm$^2$.

2. The gas diffusion electrode medium product according to claim 1, comprising sulfuric acid in an amount of from 0.01 to 0.5 μg/cm$^2$.

3. The gas diffusion electrode medium product according to claim 2, comprising sulfuric acid in an amount of from 0.01 to 0.2 μg/cm$^2$.

4. The gas diffusion electrode medium product according to claim 1, comprising an electroconductive porous material composed of a carbon fiber, wherein a fluoropolymer containing sulfur in an amount of 50 ppm or less is attached to said carbon fiber.

5. The gas diffusion electrode medium product according to claim 1, comprising: an electroconductive porous material composed of a carbon fiber; and a microporous layer containing carbon powder and provided on at least one face of said electroconductive porous material.

6. The gas diffusion electrode medium product according to claim 5, wherein said carbon powder comprises sulfur in an amount of 3000 ppm or less.

7. The gas diffusion electrode medium product according to claim 5, wherein said microporous layer comprises a fluoropolymer containing sulfur in an amount of 50 ppm or less.

8. The gas diffusion electrode medium product according to claim 5, comprising carbon black heat-treated at 2000° C. or more under an inert atmosphere for 10 minutes or more.

9. A polymer electrolyte fuel cell, comprising said gas diffusion electrode medium product according to claim 1 incorporated therein.

* * * * *